United States Patent [19]

Garabedian

[11] Patent Number: 4,986,956
[45] Date of Patent: Jan. 22, 1991

[54] PASSIVE NUCLEAR POWER PLANT CONTAINMENT SYSTEM

[75] Inventor: George Garabedian, Boston, Mass.

[73] Assignee: Stone & Webster Engineering Corporation, Boston, Mass.

[21] Appl. No.: 441,459

[22] Filed: Nov. 27, 1989

[51] Int. Cl.$^5$ .............................................. G21C 9/00
[52] U.S. Cl. .................................................. 376/283
[58] Field of Search ............... 376/283, 282, 298, 299, 376/279, 309

[56] References Cited

U.S. PATENT DOCUMENTS

| | | |
|---|---|---|
| 3,115,450 | 12/1963 | Schantz . |
| 3,253,996 | 5/1966 | Bond . |
| 3,287,226 | 11/1966 | Webb . |
| 3,414,472 | 12/1968 | Chave . |
| 3,438,357 | 4/1969 | Sulzer . |
| 3,454,466 | 7/1969 | Pitt . |
| 3,488,254 | 1/1970 | Davey et al. . |
| 3,494,828 | 2/1970 | Chave . |
| 3,666,622 | 5/1972 | Schulderberg . |
| 3,668,069 | 6/1972 | Ullrich et al. . |
| 3,713,963 | 1/1973 | Kennedy et al. . |
| 3,718,539 | 2/1973 | West et al. . |
| 3,899,391 | 8/1975 | Sulzer . |
| 4,213,824 | 7/1980 | Jabson . |
| 4,252,611 | 2/1981 | Mizumachi et al. . |
| 4,259,154 | 3/1981 | Niino et al. . |
| 4,526,743 | 7/1985 | Yamanari et al. . |
| 4,687,625 | 8/1987 | Hasegawa et al. . |

FOREIGN PATENT DOCUMENTS

| | | |
|---|---|---|
| 1142041 | 1/1963 | Fed. Rep. of Germany . |
| 1564289 | 7/1973 | Fed. Rep. of Germany . |
| 2511763 | 10/1976 | Fed. Rep. of Germany . |
| 1501356 | 11/1967 | France . |
| 42-4640 | 2/1967 | Japan . |
| 42-4878 | 2/1967 | Japan . |
| 42-5958 | 3/1967 | Japan . |
| 42-9513 | 5/1967 | Japan . |
| 42-22865 | 11/1967 | Japan . |
| 44-2673 | 2/1969 | Japan . |
| 52-104687 | 9/1977 | Japan . |
| 53-062091 | 6/1978 | Japan . |
| 54-001784 | 1/1979 | Japan . |
| 54-010835 | 1/1979 | Japan . |
| 54-019079 | 2/1979 | Japan . |
| 54-30394 | 3/1979 | Japan . |
| 60-39995 | 9/1985 | Japan . |
| 182697 | 11/1987 | Japan .................... 376/299 |
| 33697 | 2/1988 | Japan .................... 376/283 |
| 212892 | 9/1988 | Japan .................... 376/283 |
| 1113080 | 5/1968 | United Kingdom . |
| 1135626 | 12/1968 | United Kingdom . |
| 1150387 | 4/1969 | United Kingdom . |
| 1236578 | 6/1971 | United Kingdom . |

OTHER PUBLICATIONS

International Power Generation, "Design Concept for the SBWR-A Simplified Boiling Water Reactor", Jun. 1987, pp. 15-17.
"Nuclear Eng. and Design, SBWR, A Simplified Boiling Water Reactor, J. D. Duncan", Sep.-Oct. 1988, pp. 73-77.
"Atom", Jun. 1989, pp. 2-8.
"Incorporation of a Safe Integral Reactor in a Total Plant Design", Mar. 6, 1989, 7th Pacific Basin Conference, Longo et al.

(List continued on next page.)

Primary Examiner—Daniel D. Wasil
Attorney, Agent, or Firm—Hedman, Gibson, Costigan & Hoare

[57] ABSTRACT

A closed passive nuclear reactor pressure suppression containment system segrated from the nuclear island having suppression tanks connected to the reactor compartment by one or more vent lines terminating in downcomer lines submerged into a water pool in each of said suppression tanks and a return line from each suppression tank whereby water is directed from the suppression tanks to the reactor, by gravity and without active components, to flood the reactor during a loss of coolant accident.

11 Claims, 8 Drawing Sheets

OTHER PUBLICATIONS

"New Nuclear Reactor Plan Wins Backing", The Daily Telegraph, Mar. 29, 1989, F. J. Dymek.

Nucleonics Week, Jan. 26, 1989 "Privatizing U.K. Utilities Eye Smaller, Cheaper Reactors".

New Scientist, Jan. 21, 1989, "UKAEA Tries to Bury Nuclear Power", Rodger Milone, p. 39.

Nucleonics Week, Jan. 19, 1989, "DOE Small Reactor Project Plan Spurred U.K.-U.S. Collaboration", pp. 7-8.

The Energy Daily, Jan. 17, 1989, "SIR Partner Hope to Sell Reactor on Speed, Simplicity", David Fishlock, p. 2.

Nucleonics Week, "U.S. U.K. Firms Join to Develop Modular, Inherently Safe LWR", Jan. 12, 1989.

The Daily Telegraph "Yes, Sir, That's My Baby: How Small Can Be Safe", Roger Highfield, Jan. 23, 1989, p. 10.

"The Design Goals . . . ", Jun. 89', Bradbury, R. et al., ANS 1989 annual meeting.

PASSIVE NUCLEAR POWER PLANT CONTAINMENT SYSTEM

FIELD OF INVENTION

The present invention relates to the containment systems in nuclear reactor facilities and more specifically to pressure suppression systems having heat removal capabilities during a loss of coolant accident.

BACKGROUND OF THE INVENTION

Commercial nuclear reactor power plants require a reactor compartment which surrounds the nuclear reactor vessel and its primary coolant piping. In the event of a piping failure, primary coolant would be released from the reactor into the reactor compartment atmosphere.

The reactor compartment is designed to withstand the maximum pressure and temperature resulting from such a "loss of coolant" accident ("LOCA"). A low leakage structure is specified so that radioactivity released from the nuclear fuel rods in the reactor during this LOCA event will be retained in the reactor compartment.

In order to mitigate the consequences of a LOCA and for the reactor compartment to continue to reliably maintain its integrity over a long term period, several supporting systems are required. These include systems to remove heat from the reactor compartment; remove fission products from the reactor compartment; and provide a source of cooling water for injection into the reactor vessel. In addition, containment systems which feature a pressure suppression system need to maintain this capability throughout the LOCA event.

Prior art containment systems have required active components such as mechanical pumps to provide most of the above supporting system functions. The resulting design is complex, costly, and requires timely and correct operator action. In addition, these active components in turn need reliable onsite diesel generators to provide AC power throughout the accident period. As a result, a hazardous situation can occur if these diesel generators are not available due to a common cause failure.

Prior art containments have been large integrated structures which are costly and difficult to construct. Before the reactor can be installed a large portion of the integrated containment structure must first be completed. Such a construction sequence serves to lengthen the overall plant construction period.

Also, most prior art containment designs result in a continual leakage of radioactivity to the environment throughout the accident period since the containment pressure is above atmospheric. This has resulted in the need for controversial provisions for evacuating the public.

Commercialization of boiling water reactors in the U.S. began in the mid-1960's with a dispersed type of containment design, termed the Mark I plant. This design features a steel vessel for the reactor compartment which is interconnected with a separate steel suppression chamber by means of large diameter vent headers and bellows assemblies. Separate structural supports were provided for each vessel.

As advancements were sought to reduce plant costs and simplify construction, a Mark II type of containment was introduced in 1968. U.S. Pat. No. 3,713,968, Kennedy et al, shows a Mark II type containment comprising an integrated reinforced concrete structure. Supporting mechanical systems remove heat from the water pool and separate pumping systems inject water into the reacter vessel.

The arrangement of the Mark I design was not modular and, therefore, vessel fabrication delays or difficulties would directly impact the overall construction schedule. With the Mark II reinforced concrete containment, the contractor had more flexibility and was not limited by the availability of skilled vessel welders.

It soon became evident that the reactor compartment configuration for the Mark II design, even though it was larger than the Mark I plant, was too small to accommodate all of the added structures needed to accommodate pipe whip and jet impingement. Thus, a third generation of pressure suppression containment, Mark III, was introduced to the marketplace.

Major features of the Mark III system include horizontal weir type openings instead of downcomer piping and an annular pool which surrounds the drywell wall. The suppression chamber exterior wall can either be a reinforced concrete structure or a steel shell surrounded by a concrete shield wall.

The prior art designs, however, have the pressure suppression portion of the containment integrated with the reactor compartment thereby impacting the facility construction schedule. Furthermore, each of the prior art designs require active support components, such as pumps, to operate during an accident.

It is therefore an object of the present invention to provide a simple, passive containment system that requires no mechanical support systems and can function after a LOCA without operator intervention.

It is also an object of the present invention to provide a passive containment system which has its pressure suppression function segregated from the reactor compartment portion of the containment structure thus enabling a large fraction of the containment to be fabricated offsite in a modular design to expedite facility construction.

Another object of the present invention is to limit design complexities and analytical difficulties in the system by decoupling the dynamic and hydrodynamic forces occuring during the pressure suppression process from the nuclear island where the reactor compartment is located.

It is a further object of this invention to provide a containment system than can remove soluble fission products and heat from the containment environment throughout the LOCA event and passively transfer heat from the system for an indefinite period of time without operator action.

A further object of the present invention is to provide a system to passively inject water into the reactor to keep the reactor vessel in a flooded state.

SUMMARY OF THE INVENTION

The present invention comprises a passive nuclear reactor pressure suppression containment system comprising a reactor compartment, at least one vent line extending from the reactor compartment, a plurality of suppression tanks elevated above the reactor compartment and partially filled with water, at least one downcomer line from said vent line directed into each suppression tank and terminating below the water level in said suppression tank, interconnect lines connecting the gaseous space in each suppression tank and at least one return line from each suppression tank, located below the water line on said suppression tank when the system is in a pre-accident state, to return water to the reactor vessel wherein, upon failure in the reactor causing heat and increased pressure, steam and noncondensable gases will be directed through said vent line and said downcomer lines into the water in the suppression tanks, the gases being filtered and the steam condensed by the water in said suppression tanks, and the noncondensable gases vented into the gaseous space in said suppression tanks causing water flow through the return lines into the reactor.

The system described is a closed system sealed entirely from the environment. This allows for long term containment heat removal, aided by increased surface area suppression tanks, i.e. having fins on the exterior of said tanks, in an open or vented suppression structure providing circulation of ambient air over the tanks. The closed system eliminates the need for replenishment of a water pool for containment heat removal wherein the condensate is retained in the system.

The elevated nature of the suppression tanks, generally located at or above grade, over the reactor compartment, generally located below grade, results in a large static head of water which is sufficient for gravity circulation of water flow from the suppression tanks to flood the reactor vessel.

The pressure suppression portion of the containment system is further contemplated to be segregated from the nuclear island where the reactor compartment is located. This design allows for modular offsite construction, wherein the pressure suppression components may be produced modularly and brought to the facility site and installed in parallel with ongoing construction efforts on the nuclear island, thereby reducing the overall construction time necessary for the facility. This arrangement further reduces dynamic loads to the nuclear island components and structures caused by hydrodynamic forces associated with pressure suppression by segragating the pressure suppression tanks from the reactor compartment. Relative movements between the reactor compartment and suppression tanks due to thermal expansion or seismic forces can be accommodated by seismic anchors and expansion bands for small bore piping. For the large ducts, i.e., vent lines, a bellows assembly may be used or, alternatively, expansion loops can be provided in each branch line.

Furthermore, one or more vacuum tanks can be used in the present system, being evacuated to decrease the pressure in the closed suppression system to subatmospheric conditions during a LOCA. Since the system is closed and has low leakage characteristics it can retain subatmospheric conditions thereby reducing the possiblity of radioactive escape from the system due to high pressure containment.

BRIEF DESCRIPTION OF THE DRAWINGS

The following drawings, in which like reference characters indicate like parts, are illustrative of embodiments of the invention and are not intended to limit the scope of the invention as encompassed by the FIG. 1 is a cross-sectional plan view of the Mark I type containment system of the prior art.

DETAILED DESCRIPTION OF THE INvENTION

Figure 1:
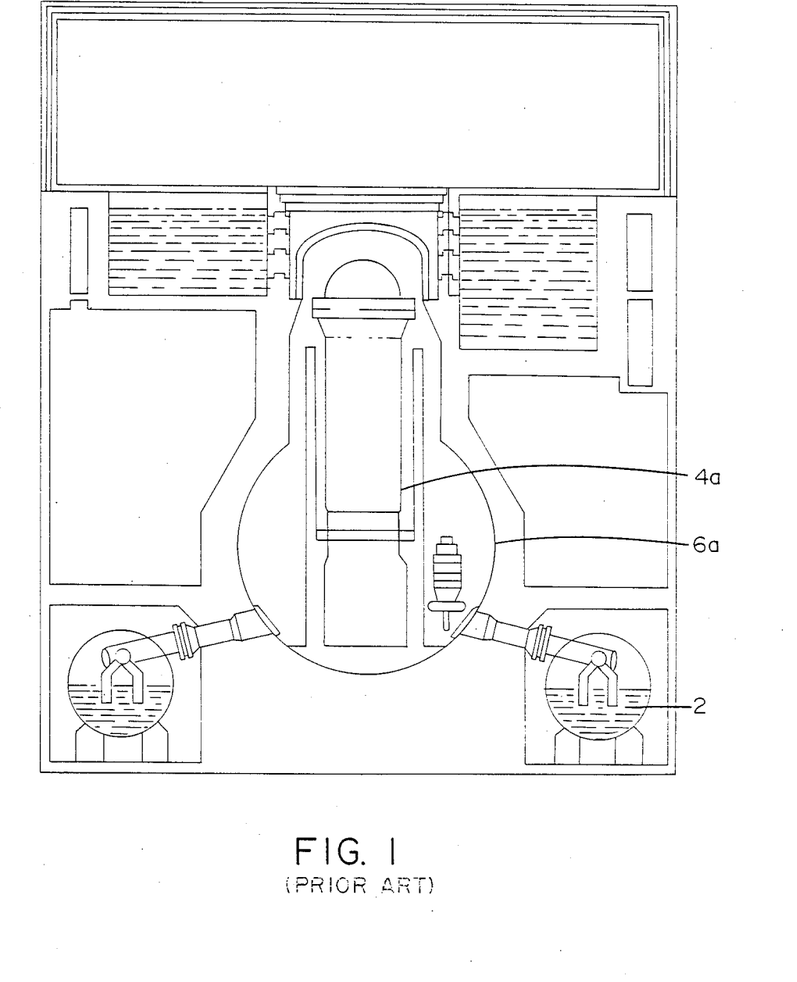
Figure 2:
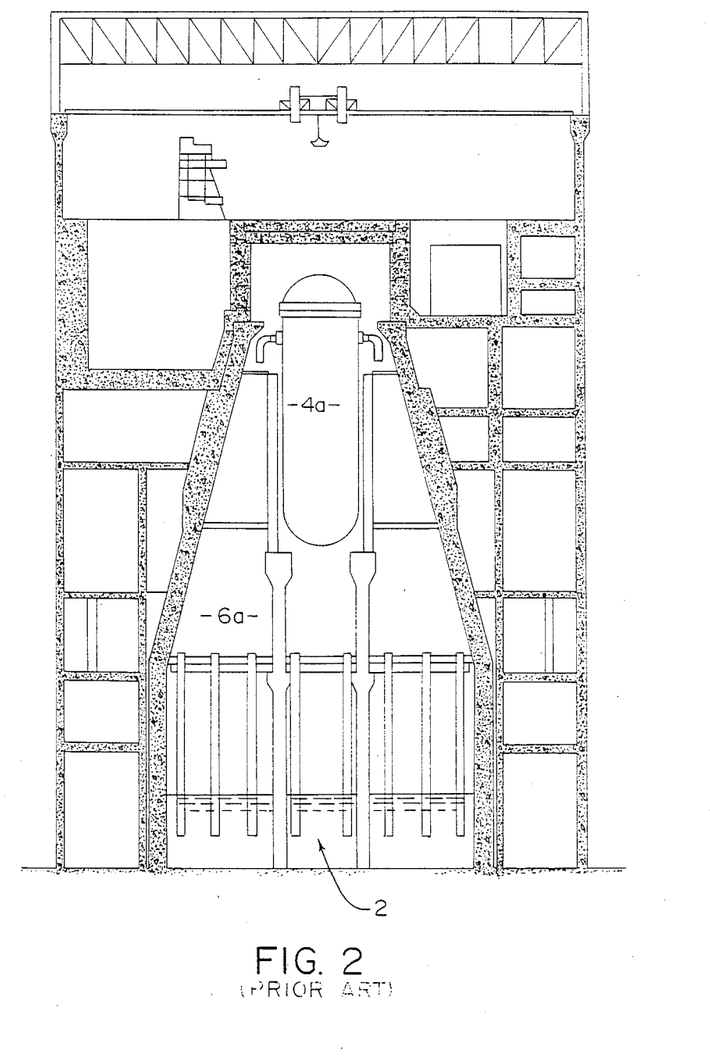
FIG. 2 is a cross-sectional plan view of the Mark II type containment system of the prior art.
Figure 3:
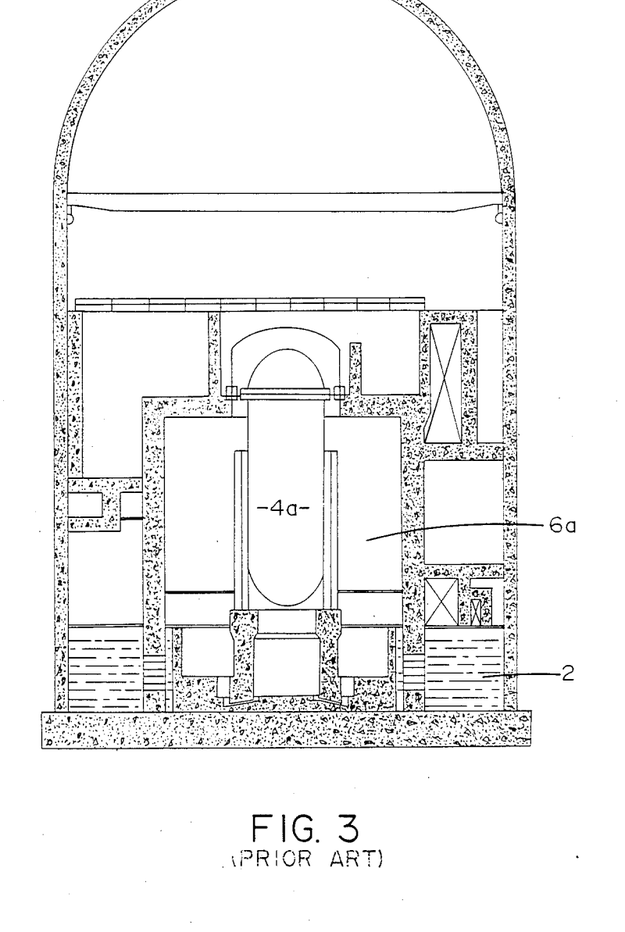
FIG. 3 is a cross-sectional plan view of the Mark III type containment system of the prior art.

Pressure suppression systems of the prior art, shown in FIGS. 1, 2 and 3 have utilized a reservoir of water 2 for suppressing the peak pressure of the containment during failure of the reactor coolant system in the reactor compartment. As seen in FIGS. 2 and 3 these reservoirs 2 are usually concrete chambers, or as in FIG. 1 are torus shaped vessels, which are located below the reactors 4a. These systems use separate pumping systems to inject water into the reactor vessel 4a during a LOCA.

Figure 4:
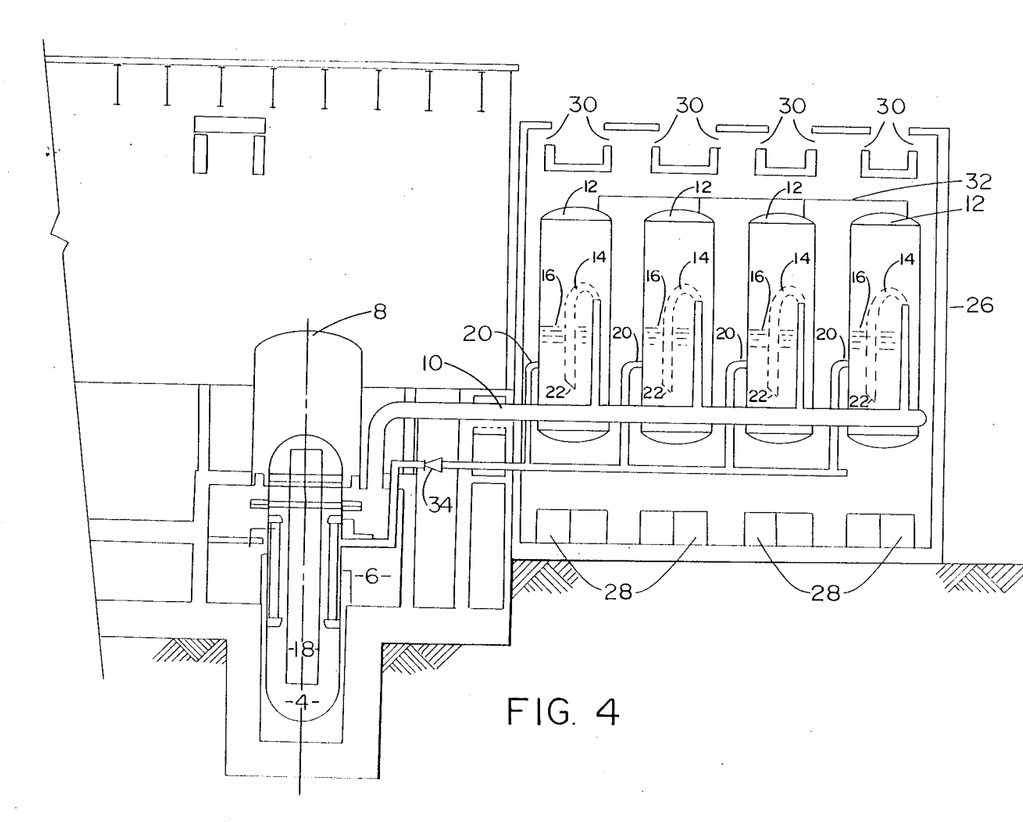
FIG. 4 is a plan view of the containment system of the present invention in partial cross-section.

The present system, however, shown in FIG. 4 comprises a segregated suppression system which is located away from and above the reactor compartment 6 containing the reactor 4.

The reactor compartment 6 containing the reactor 4 can be a steel lined reinforced concrete structure capped by a removeable steel dome 8 for refueling. A vent pipe 10 connects the gaseous space of the chamber 6 to the pressure suppression tanks 12 by means of downcomer pipes 14 which terminate in stagnant pools of water within the suppression tanks 12.

Segregation of the suppression system from the nuclear island, where the reactor compartment is located, reduces dynamic loads caused by hydrodynamic forces associated with pressure suppression during a LOCA. Hydrodynamic forces can be decoupled from the nuclear island by use of separate basemats. The piping interconnections between these areas are designed to withstand any such dynamic loads. Seismic anchors and expansion bands will acccommodate small bore piping. For large ducts such as a vent line 10 between the reactor compartment 6 and the suppression tanks 12, a bellows assembly (not shown) may be used, as well as expansion loops provided in each branch vent line 10. Obviously, for nuclear island designs where hydrodynamic forces are small or not a major design issue, the designer has the option of segregating the suppression tank support structure from the nuclear island or utilizing a structurally integrated design.

The suppression tanks 12 are preferrably steel tanks which can be produced individually offsite and installed at the facility to reduce construction time. Steel tanks are preferred because they facilitate heat transfer to the atmosphere. The number of tanks 12 can be any number but should be a number chosen to enhance a surface to volume ratio assuring that heat can be rejected by natural circulation of air or water over the exterior. The tanks 12 are sized for the long term passive heat exchange phase of the accident.

The downcomer line 14 terminates well below the water level 16 in the suppression tank 12, the discharge end 22 of said downcomer pipe 14 having a 45° cut. The water level 16 should be maintained high enough above the end 22 to assure that the water acts as a scrubber for any fission products which may be in the gas flow from the reactor 4 during a LOCA.

The stagnant pool of water within each suppression tank 12 has a surface level 16 which is sufficiently high above the reactor core 18 of the reactor 4 that a return flow of water is promoted from each tank 12 when the reactor vessel 4 is depressurized. The return flow of water to the reactor vessel 4 is effected by a return line 20 from each tank 12 exiting the tank 12 from a point below the water level 16 when the system is in a pre-accident, ready state.

Figure 5:
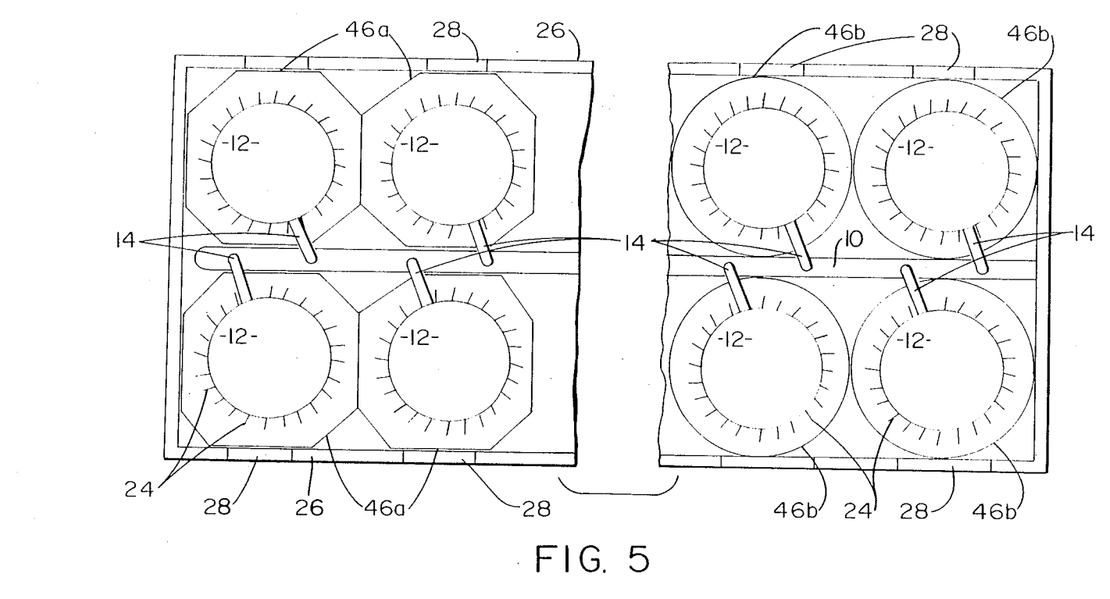
FIG. 5 is a cross-sectional plan view of the suppression structure of the present invention.

The suppression tanks 12 have vertical fins 24 on their exterior (see FIG. 5) to promote heat transfer to the environment surrounding the tanks 12. The fins 24 can be any size and shape but are preferably rectangular in shape, one-half inch thick and approximately seven inches wide. They are preferably attached to the suppression tank wall with a pitch of about one inch. It is understood however that other means of enhancing heat transfer from the tanks 12 may be used, such as air boundary layer devices, enchanced surface cold walls, etc.

Preferably, the suppression tanks 12 are located within a suppression structure 26 made of concrete to shield any radioactivity contained within the structure 26, i.e., from tanks 12 made radioactive by their contents, and to protect the system from any environmental missiles.

The suppression structure 26, seen in FIG. 4, has openings 28 at the bottom thereof which allow ambient air to enter the structure 26. Of course, other means of providing ambient air may be utilized such as providing openings at the top of the suppression structure and appropriate ducting to direct the inlet ambient air to the bottom of the tanks 12, etc. The ambient air passes over the suppression tanks 12, removing heat from the tanks 12, and the heated air exits through openings 30 at the top of the structure 26. Each suppression tank 12 is optionally enclosed within a shroud 46 which can be shaped either as a polygon 46a or in the form of a circle 46b. The function of the shroud 46 is to minimize air turbulence and thus assure a uniform and low pressure drop flow path thereby enhancing the natural circulation of the ambient air.

The roof of the structure 26 is designed with consideration for shielding and missile protection from the external environment. Known shielding materials can be used in the roof and the shape of the roof can include offset openings, as shown in FIG. 4, wherein radioactivity from the suppression tanks 12 after a failure cannot shine to the overhead sky and reflect back to the earth surface.

It has been the practice in the United States to examine a spectrum of pipe breaks up to and including the double ended rupture of the largest pressurized piping within the primary containment. For each case, the resulting pressure and temperature need to fall within the containment design values.

Severance of piping containing reactor coolant results in a depressurization of the reactor coolant system and the entire primary coolant inventory needs to be accommodated by the pressure suppression system. For a pressurized water type of reactor, the main steam or feedwater line breaks release only limited amounts of energy before the system isolation valves close and terminate the event.

During a pipe failure or accident within the reactor compartment 6, the pressure within the compartment 6 will rise due to the energy of the fluid within the pipe. The pressure rise sweeps the ambient gas (usually nitrogen to avoid combustion) within the reactor compartment 6, as well as the steam formed during the LOCA, into the vent line 10. The steam/gas mixture then enters each suppression tank 12 via downcomer lines 14 which terminate well below the water level 16 in each of said tanks 12.

As stated above, the termination end 22 of each downcomer line 14 is cut at a 45° angle. This configuration has been shown to eliminate major hydrodynamic pressure disturbances due to a chugging type of steam condensation.

The gases exiting the termination end 22 of the downcomer line 14 will bubble through the water in the suppression tanks 12 thereby filtering fission products and causing condensation of steam. The remaining noncondensable gases enter the gaseous atmosphere above the water line 16 in each suppression tank 12. A uniform gaseous pressure in each of the individual tanks 12 can be assured by interconnect lines 32 which connect the gaseous space of each tank 12.

Steam exiting the downcomer lines 14 and condensing in the water pools heat the water inventory in each tank 12. Eventually most of the noncondensable gases in the reactor compartment 6 will be transferred to the gaseous space above the water level 16 in the suppression tanks 12. This serves to increase the gaseous pressure in the suppression tanks 12. The pressure in the reactor compartment 6 is established by the gaseous pressure in each tank 12, the level that the downcomer line end 22 is submerged below the water level 16 and the flow pressure losses in the vent line 10 and the downcomer lines 14. As the temperature of the water increases, the water vapor pressure also increases and the pressure levels throughout the system rise accordingly.

In a preferred embodiment each of two vent lines 10 connect to four suspresion tanks 12. The total volume of water initially stored in all eight tanks 12 is about 70,000 ft$^3$ and the vapor volume for all tanks 12 is 80,000 ft$^3$, approximately the same size as the free volume in the reactor compartment 6. Each suppression tank 12 is approximately 20 feet in diameter and 60 feet in height and is filled approximately halfway with water. The downcomer line 14 protrudes vertically into the water pool for approximately a 15 feet submergence. Such a submergence will allow the reactor compartment atmosphere to be about 7.0 p.s.i. higher in pressure then the atmosphere in the air space of each suppression tank 12.

Preferably, the suppression tanks 12 have vertical fins 24 on their exterior to promote heat transfer to the ambient air circulating through the suppression structure 26. Eventually, after several hours, the temperature of the water in the suppression tanks 12 will be high enough that the total heat loss to the ambient air in structure 26 equals the rate at which heat is being added in the reactor compartment 6 from the decay heat generated in the reactor core 18. This point in time represents the condition when the reactor compartment 6 and suppression tanks 12 are at their highest long-term pressure and temperature. Continued heat exchange from the suppression tanks 12 will then serve to cool the entire system and the pressures in the reactor compartment 6 and the suppression tanks 12 will reduce accordingly.

During the LOCA event, as coolant leaves the reactor 4 through the pipe break, the pressure within the reactor 4 falls. After sufficient coolant has escaped, the reactor 4 will gradually reach equilibrium with the pressure in the reactor compartment 6. As this condition is approached, the static head of the water in return line 20 becomes sufficient to cause flow of water from the suppression tanks 12 to the reactor vessel 4 along return lines 20. At such a point in time, flow to the reactor vessel, through return lines 20, commences upon the opening of a check valve 34 requiring a predetermined pressure change, i.e. one-half p.s.i., to open. The check valve 34 in the return line 20 also prevents the reactor coolant from flowing directly to the suppression tank 12 when the reactor vessel 4 is pressurized. Opening of the check valve 34 causes the water level 16 in each tank 12 to drop as the water from the tanks 12 flows by gravity into the reactor vessel 4.

The amount of water which can be injected in this fashion is limited by the elevation of each suppression tank 12. The size of each suppression tank 12 is such that the volume of water between the elevation of the return line 20 on the suppression tanks 12 and the water level 16 within the tanks 12 at the pre-accident, ready state is sufficient to reflood the reactor core 18.

The elevation of the return line 20 on the tank 12, which equals the water level 16 once the check valve 34 opens, should be above the termination end 22 of the downcomer line 14 in order to assure that gases from the reactor compartment 6 continually flow through water in the suppression tanks 12. Continued coverage of the termination end 22, preferably by at least 3 feet of water, also assures that soluble radioactive products within the steam flow are continually removed by the stored water in each tank 12.

Over a prolonged period of time the entire system will cool without the need for operator action. Whenever the water level 16 is elevated above the return line 20, due to continued condensation of steam from the reactor compartment 6, the gravitational flow of water to the reactor vessel 4 will resume. Eventually, the reactor vessel 4 will be flooded and coolant will overflow into the reactor compartment 6 through the broken primary coolant pipe.

The ability to operate at subatmospheric conditions, set forth above, is another major benefit of the present invention. The atmosphere in the reactor compartment 6 and vent line 10, as well as in the gaseous environment of the suppression tanks 12, are partially evacuated in this closed system and maintained substantially subatmospheric during a LOCA thereby decreasing the possibility of escape of radioactivity into the environment. This design feature can serve to provide the technical basis for eliminating the need for offsite emergency evacuations.

Prior experience with reactor vessel equipment (i.e. pumps, valves, instrumentation, etc.) operating in vacuum containments has shown that satisfactory operating conditions can be obtained at an absolute pressure of 10.0 p.s.i. Such a pressure in the reactor compartment 6 would enable the suppression tank airspace to be maintained at about 3.0 p.s.i. absolute. A lower pressure in the suppression tanks 12 is practical since no electrical components are located therein. For the case where the reactor compartment free atmosphere is approximately the same volume as the suppression tank atmosphere, the pressure in the suppression tank air space would be at least 13.0 p.s.i. absolute after a LOCA where all of the noncondensables have been transferred to the suppresion tank air space. Use of an additional vacuum tank 36 would enable the suppression tank pressure to be further reduced.

Figure 6A:
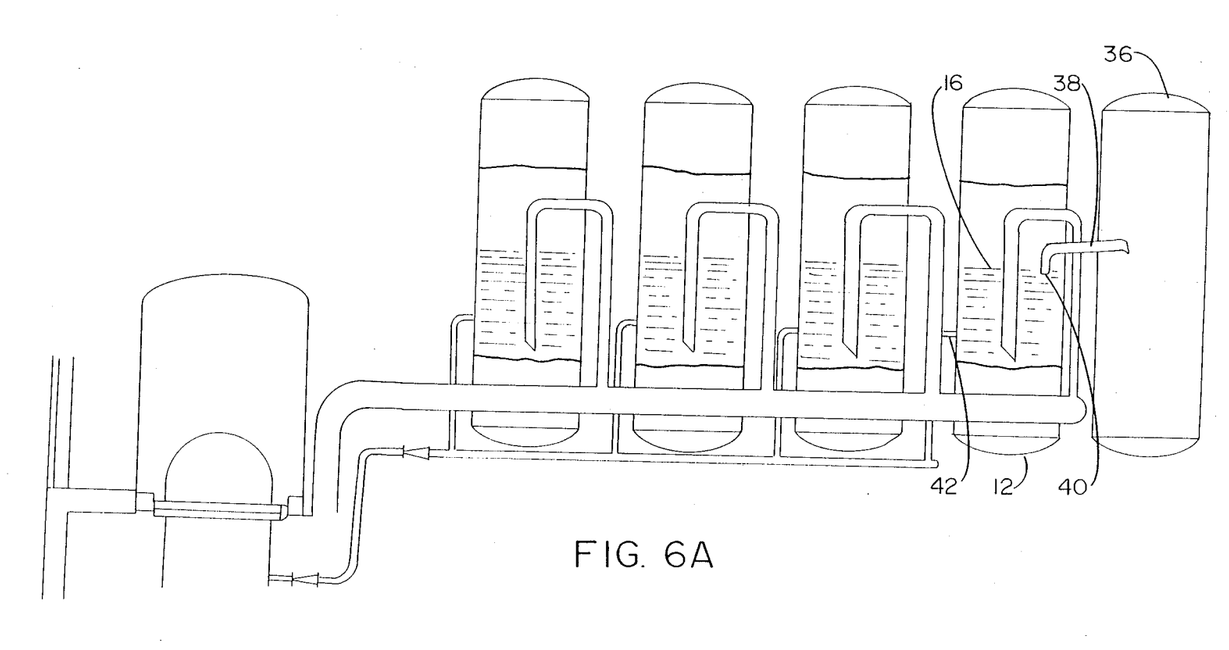
FIG. 6A is a plan view of the present invention employing an additional suppression tank to ensure a low pressure system.
Figure 6B:
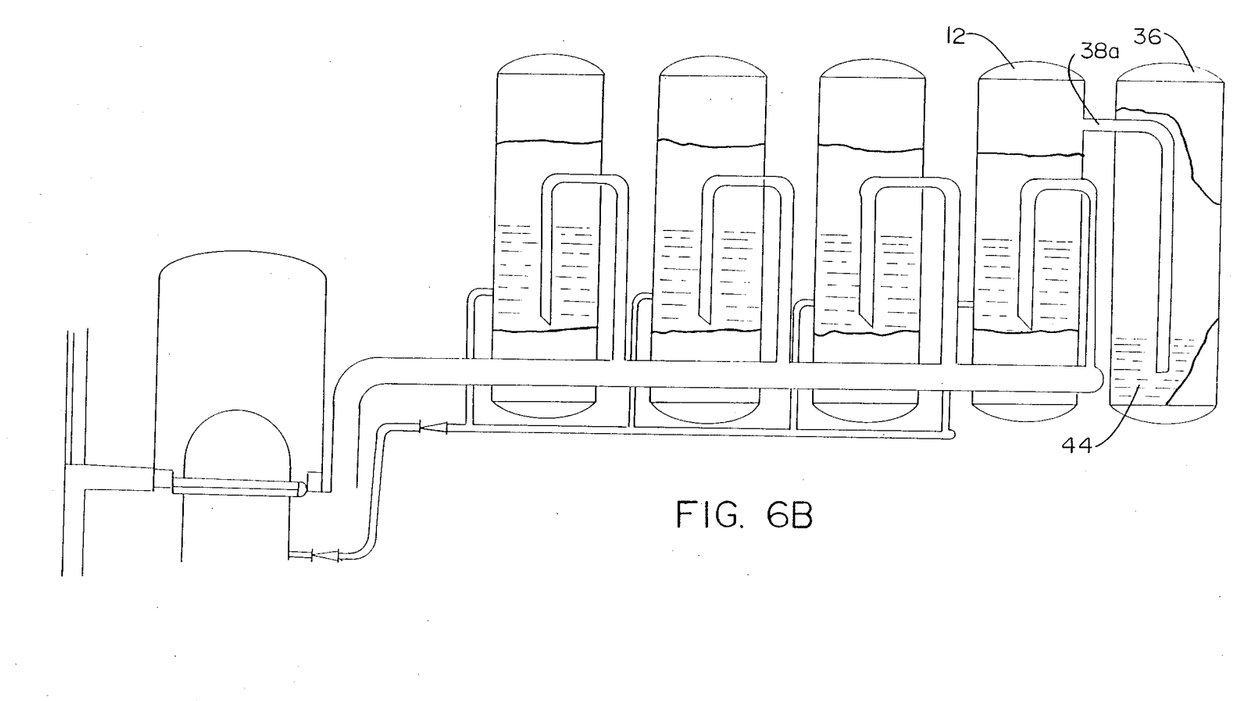
FIG. 6B is a plan view of another emodiment of an additional suppression tank to ensure a low pressure system.

FIGS. 6A and 6B illustrate emobodiments utilizing vacuum tanks wherein the subatmospheric conditions can be maintained throughout the LOCA. In FIG. 6A the vacuum tank 36 is not hooked to either the vent header 10 or the return line 20, however, a connection pipe 38 connects the vacuum tank 36 to the suppression tank 12. The connection pipe 38 extends from the evacuated tank 36 to the suppression tank 12 and terminates at end 40 below the water level 16 in tank 12 to create a water seal.

The depth at which pipe end 40 terminates below water level 16 should be such that more than 3.0 p.s.i. pressure in the air space above the water level 16 in suppression tank 12 is required to break the water seal. Then, during a LOCA, when the pressure of the gaseous space in the suppression tank 12 starts to increase, the water seal is broken and the free volume the in vacuum tank 36 will become available to reduce the pressure in the suppression tanks 12.

The size of the vacuum tank 36 can be adjusted to regulate the final pressure in the air space of suppression tanks 12. Similarly, more than one vacuum tank 36, or vacuum tight evacuated structure, i.e. steel lined reinforced concrete, can be used.

In a preferred embodiment, the desired equilibrium pressure of the noncondensables is such that when it is added to the peak vapor pressure of the water in the suppression tanks 12 airspace, at the time when the tank 12 reaches the maximum temperature during the LOCA, the total pressure in the tanks 12 will be subatmospheric.

During a short period while the LOCA is occuring, the atmosphere in the reactor compartment 6 may be slightly above atmospheric pressure due to the water leg in each downcomer line 14. This overpressure will be reduced to subatmospheric when the reactor compartment 6 is depressurized and the excess water in the suppression tanks 12, above the suppression tank return line opening 42, flows by gravity to the reactor compartment 6.

FIG. 6B illustrates an alternative method of connecting a vacuum tank 36 to the suppression tanks 12 wherein a connection pipe 38a connects the airspace of suppression tank 12 with the interior of the vacuum tank 36. At the bottom of the vacuum tank 36 is a water seal 44 which prevents the atmosphere from the suppression tank 12 from entering the vacuum tank 36 until the pressure rises sufficiently in the suppression tank 12 to overcome the hydraulic head of the water seal 44.

Notwithstanding, use of a separate vacuum vessel is not necessary to achieve the benefits of a vacuum containment. Additional suppression tanks can also be used. Additional water mass will serve to reduce the peak temperature of the system. Additional surface area of the tanks will increase the heat transfer rate and serve to reduce the peak suppression tank temperature. With lower peak temperature, higher pressure is permissible for the noncondensable gases in the suppression tanks.

PROPHETIC EXAMPLE

The containment design provided herein is applicable to water cooled reactors whether of the boiling water type ("BWR") or pressurized water type ("PWR"). For illustrative purposes application to a compact pressurized water reactor (PWR) that has its steam generators installed within the reactor vessel is described below. A PWR reactor rated at 1000 Mwt, or 320 Mwe, features small primary coolant piping, the largest size being 2.75 inches in diameter.

The design pressure of the containment is 241 KPa (35 p.s.i.g.) while the design temperature of the reactor compartment 6 is 171° C. (340° F.) and that of the suppresison tanks 12 is 116° C. (240° F.). The containment free volume and passive heat sink area are designed to limit the maximum pressure and temperature following an accident to less than the design values. The containment atmosphere is inerted to prevent hydrogen ignition.

For a LOCA event involving failure of the piping in the PWR reactor 4, initially at 2250 p.s.i., the system will slowly depressurize and the water level within the reactor 4 will slowly recede until, at about 3.5 hours after the accident, the level in the reactor 4 will be approximately 2 feet above the reactor core 18 and the reactor pressure will have decreased to less than 400 p.s.i. The reactor safety relief valves can be operated to depressurize the reactor 4 to permit gravity injection of water from the suppression tanks 12. Alternative methods of depressurizing the reactor vessel 4 can also be employed, i.e. injection from pressurized accumulator tanks.

Once the reactor 4 is depressurized its pressure will approximate the pressure in the reactor compartment 6. A closed circuit will form whereby water within the reactor 4 is evaporated by the decay heat of the reactor core 18. The steam generated will enter the reactor compartment 6 and flow through the vent line 10 and downcomer lines 14 to the water pool in each suppression tank 12. The steam will condense in each tank 12 while the water is being cooled by natural circulation air flow outside of the tanks 12. With the use of two separate vent lines 10 to four suppression tanks 12 each, shown in FIG. 7, water will be returned back to the reactor 4 by means of two separate gravity return lines 20 and the cycle will begin again.

Figure 7:
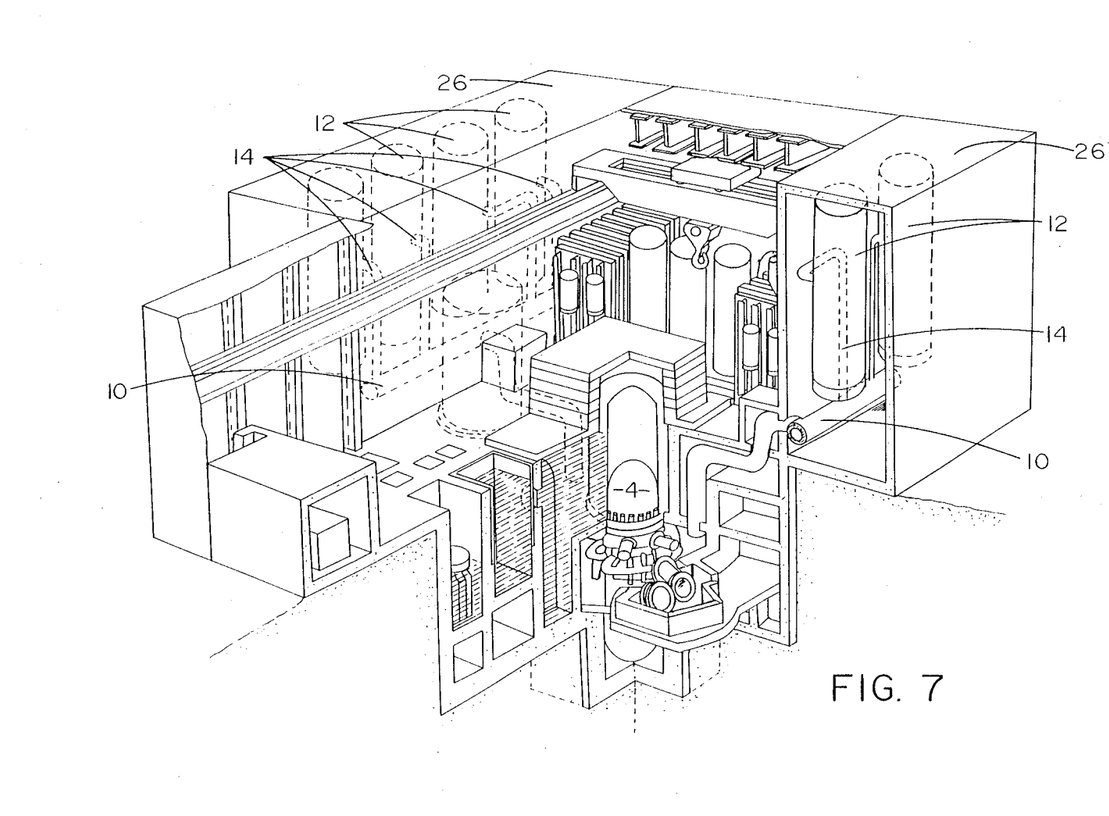
FIG. 7 is a cut-away perspective view of a reactor facility incorporating the containment system of the present invention.

Two return lines 20 are preferably used, each servicing one set of four suppression tanks 12, so that even if one line 20 does fail (e.g., due to a faulty check valve 34 or due to a leak in the normally pressurized portion of the line 20 between the reactor compartment 6 and check valve 34) sufficient water inventory is available in the balance of the suppression tanks 12 to reflood the reactor vessel 4 (see FIG. 7).

The typical transient for a coolant system rupture with a typical prior art pressure suppression containment design is a rapid blowdown (30 sec.) with the reactor compartment 6 reaching a peak transient value at about the time the downcomers 14 are cleared first few seconds). Long-term containment conditions are not controlling since it is assumed that the operator will turn on active components of the containment heat removal system and thus prevent the containment temperature and pressure from rising above the design limits.

For this invention, however, since it is a passive plant design, the long-term performance is just as critical as the short-term performance. The short-term pressure transient is a function of the size of the vent line 10 and the number and size of the downcomer lines 14 for each suppression tank 12. Two five foot diameter vent lines 10 are provided to direct flow from the reactor compartment 6 to downcomer lines 14 being 2 feet in diameter for each of the eight suppression tanks 12. This results in a break area/vent area ratio of 0.0016.

The net vent flow area and vent loss coefficient are such that the reactor compartment pressure is controlled by the rising backpressure in the gaseous space of the suppression tanks 12 and the downcomer line submergence. A submergence of 15 feet (within a 30 foot deep pool) is used. The pool area/vent area is large (a factor of 100) and, as a result, minor pool swell effects occur from noncondensables initially flowing through the vents.

The transient response of the containment is a slow build up of pressure in the reaction compartment 6 and suppression tank gaseous space. No rapid reactor compartment pressure spike, typical of the conventional pressure suppression systems, is present due to the large margin provided in the size of the vent line 10 and downcomer lines 14. Upon completion of the transfer of the noncondensable gases from the reactor compartment 6 to the suppression tanks 12, the long-term transient is controlled by the heat up of water in the suppression tanks 12. This in turn is dependent on the initial water inventory, the heat rejection rate from the tanks 12, and the decay heat rate of the reactor core 18. For the small PWR reactor situation, a pool volume/reactor power level factor of 38.8 is used.

The peak containment pressure and temperature are reached in the 15-20 hour period (after the start of the LOCA). At this point in time, the heat rejection rate from the suppression tanks 12 (assuming a 40° C. (100° F.) ambient air temperature) equals the decay rate. From this point in time, the overall system begins to cool and a gradual reduction in pressure occurs.

The invention in its broader aspects is not limited to the specific embodiments herein described but departures may be made therefrom within the scope of the accompanying claims, without departing from the principles of the invention and without sacrificing its chief advantages.

I claim:

1. A closed passive nuclear reactor pressure suppression containment system comprising a low leakage reactor compartment housing a reactor vessel and its associated primary coolant system, at least one vent line extending from the reactor compartment, a plurality of suppression tanks elevated above the reactor compartment and partially filled with water, a downcomer line from said vent line directed into each suppression tank at a point above the water level in said tanks and terminating below the water level in said suppression tanks, and at least one return line from each suppression tank, located below the water level in said suppression tank, to return water to the reactor vessel through a check valve in said return line, wherein during a loss of coolant accident causing an increased pressure in the reactor compartment steam and gases are directed through said vent line and said downcomer lines, the gases being filtered and steam condensed by said water in said suppression tanks and noncondensable gases vented into the gaseous space in said suppression tanks, and the heat from said condensed steam is transferred from said suppression tanks to the surrounding environment.

2. A system as defined in claim 1 further comprising at least one interconnect line connecting the gaseous space in each suppression tank.

3. A system as defined in claim 1 further comprising a suppression structure in which said suppression tanks are housed having openings at both the bottom and top thereof to provide flow of ambient air whereby said ambient air enters the openings at the bottom of the suppression structure, extracts heat from the suppression tanks and said heated air rises out of the suppression structure through the openings at the top of the structure.

4. A system as defined in claim 3 further comprising a plurality of vertical fins on the exterior of each suppression tank to aid in the transfer of heat to the ambient air.

5. A system as defined in claim 3 wherein the openings at the top of the suppression structure are offset to prevent escape of radioactive shine from the suppression tanks.

6. A system as defined in claim 1 wherein the volume of water in the suppression tanks above the elevation of the return lines on the suppression tanks is sufficient that when said check valve opens the water will flood the reactor vessel.

7. A system as defined in claim 6 wherein the downcomer lines terminate in the suppression tank at a point below the water level, even once the check valve opens and the water level falls to the point of elevation of the return line, that the gases emerge the downcomer line at least three feet below the water level.

8. A system as defined in claim 1 wherein the elevation of the return lines on the suppression tanks is high enough over the reactor compartment that the water in the suppression tanks above the return line will flow by gravity into the reactor vessel.

9. A system as defined in claim 1 further comprising one or more vacuum tanks connected to the suppression tanks, said vacuum tanks being of sufficient size to substantially maintain the pressure of the system at subatmospheric conditions during an accident.

10. A system as defined in claim 9 wherein the evacuated environment in the vacuum tank is connected to the suppression tank by a connection pipe which terminates just below the water level in the suppression tank so that flow of water to the reactor compartment through the return lines lowers the water level enough to expose the connection pipe in the suppression tank to the atmosphere of the suppression tank and the atmosphere in the suppression tanks will be drawn into the vacuum tanks thereby lowering the pressure in the system.

11. A system as defined in claim 9 wherein the vacuum tank is connected to the atmosphere of the suppression tank by a connection line which terminates below a water seal in the vacuum tank so that when the pressure in the suppression tank rises sufficiently to overcome the hydraulic head of water in the vacuum tank the atmosphere in the suppression tank will be drawn into the vacuum tank.

* * * * *